United States Patent
Bowling

[15] 3,698,101
[45] Oct. 17, 1972

[54] CONTAINERS FOR FIXING, HOLDING, AND STORAGE OF DEAD INSECT SPECIMEN

[72] Inventor: Clarence C. Bowling, 1750 Wooten Road, Beaumont, Tex. 77707

[22] Filed: Feb. 8, 1971

[21] Appl. No.: 113,434

[52] U.S. Cl. .................................35/20, 220/97 F
[51] Int. Cl. ..............................................G09b 23/36
[58] Field of Search ..................35/20; 220/9 F, 97 F

[56] References Cited

UNITED STATES PATENTS

| | | | |
|---|---|---|---|
| 2,663,527 | 12/1953 | Joslyn | 35/73 X |
| 3,106,313 | 10/1963 | Kurhan | 220/9 F UX |
| 3,335,846 | 8/1967 | Mills | 220/9 F UX |
| 3,484,015 | 12/1969 | Rowan | 220/9 F UX |

FOREIGN PATENTS OR APPLICATIONS

| | | | |
|---|---|---|---|
| 1,458,190 | 10/1966 | France | 35/20 |
| 1,593,589 | 6/1970 | France | 220/9 F |

OTHER PUBLICATIONS

Stansi Scientific Division Catalog rec' d Feb. 1969, page 51 only.

Primary Examiner—Harland S. Skogquist

[57] ABSTRACT

A light weight container molded of penetrable material for spreading, fixing, holding, and storage of dead insect specimen.

3 Claims, 3 Drawing Figures

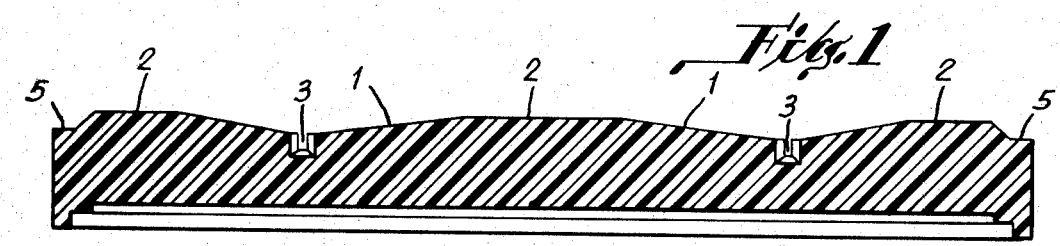
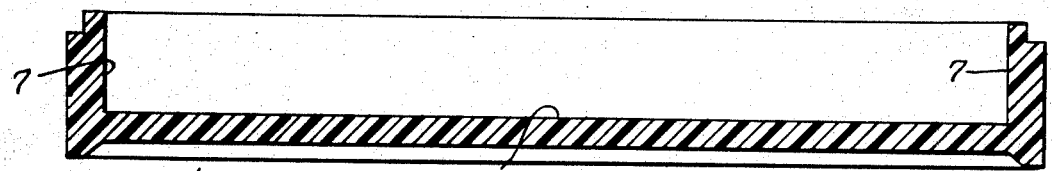
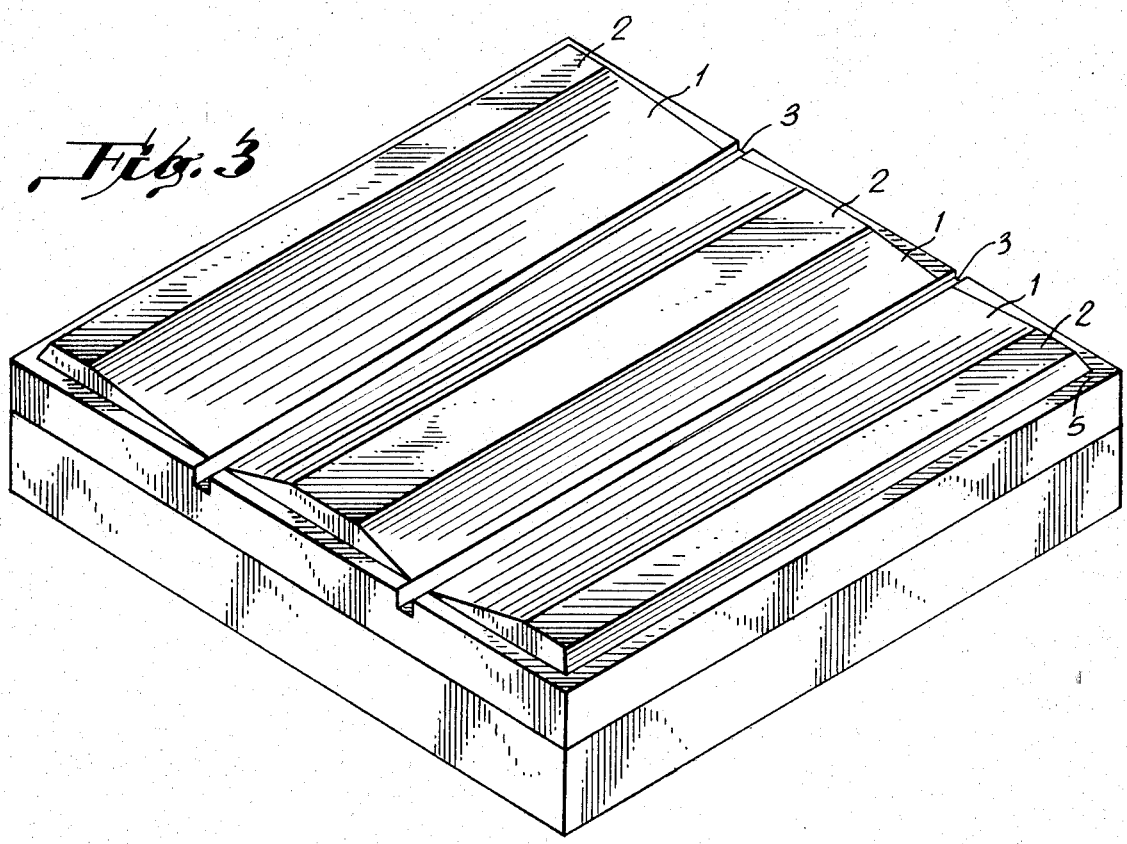
INVENTOR
Clarence C. Bowling

CONTAINERS FOR FIXING, HOLDING, AND STORAGE OF DEAD INSECT SPECIMEN

This invention relates to a lightweight container for fixing, holding, and storage of dead insect specimen and to improvements therein and to elements combined therewith for improving its usefulness.

The primary object of the invention is to provide a lightweight container for safe holding and storage of dead insect specimen which is simple to construct by molding from a readily penetrable material and which can also be utilized for pinning, spreading and fixing of dead insect specimen.

An object of the invention is the provision on the top surface of the upper element configurations which serve as insect spreading boards and as readily penetrable surfaces to be utilized as working space for pinning insects in addition to serving as a structural component of the upper element of the container.

Another object of the invention is the provision of horizontally and vertically tapered grooves in the spreading boards, contained in the upper element, to provide varied amounts of space to receive insects with varied-sized bodies for spreading and fixing by drying.

Another object of the invention is the provision of a container in which the lower element is provided with a readily penetrable surface for holding pinned insects specimen which is an integral and continuous part of the entire element eliminating cracks and openings that could provide entry for destructive pests.

A still further object of the invention is the provision of a depression in the under surface of the lower element and a matching protusion in the surface of the upper element to facilitate convenient and safe stacking of several containers one on top of the other in storage.

Both the upper and lower elements of the two-part container will be formed by molding from a light weight readily penetrable material such as expanded polystyrene, expanded urethane resins, or expanded polyethylene.

These objects and still further objects, advantages, and features of the invention will appear from the following description in conjunction with the accompanying drawings:

FIG. 1 is a cross sectional view of the upper element showing tapered grooves and beveled surfaces of the spreading boards and other described features.

FIG. 2 is a cross sectional view of the lower element showing described features.

FIG. 3 is a perspective view of the container showing spreading boards and working space as an integral part of the upper element.

Referring with more particularity to the drawings, the container consists of an upper element and a lower element. The upper element consisting of spreading boards with beveled surfaces 1 for receiving and spreading the wings of dead insects in a morphologically correct position until fixed by drying and containing grooves that are tapered both vertically and horizontally 3 for receiving and holding the bodies of said insects of varied sizes. It will be understood that spreading boards of similar design are marketed and in use but are not an integral part of an element of a container and are lacking the stationary vertically and horizontally tapered groove 3. The upper element also consists of flat penetrable working surfaces 2 which can be utilized for holding newly pinned insects in a correct morphological position until fixed by drying.

The bottom element consists of a rectangular shaped container with side walls 7 and a flat penetrable surface 6 for the insertion and holding of pinned and fixed insects, both molded from the same material as one complete unit exclusive of cracks and opening that could provide entry for insects or pests that feed on dead insect specimen. It will be understood that similar containers for holding insect specimen are marketed and in use, but the side and bottom are composed of separate pieces of wood or other dense material with a separate piece of penetrable material in the bottom for insertion and holding of pins. Containers of this type of a necessity leave opening for possible entry of insect pests that destroy dead specimen.

The recessed surface 4 of the lower element and the matching protruding surface 5 of the upper element provide for the convenient, compact, and safe stacking of several containers one on top of the other in storage.

Both the upper and lower elements which can be molded of material such as expanded polystyrene provide a container which is light weight with considerable shock absorbing ability to prevent breakage of fragile insect specimen if accidentally dropped.

I claim:

1. A container having upper and lower elements of molded readily penetrable material for fixing, holding, and storage of dead insect specimens with insect spreading boards and working space incorporated into and serving as a structural part of the upper element with said spreading boards having vertically and horizontally tapered grooves to provide varied amounts of space for receiving insects with varied-sized bodies for spreading and drying.

2. A container having upper and lower elements of molded readily penetrable material for fixing, holding, and storage of dead insect specimens with insect spreading boards and working space incorporated into and serving as a structural part of the upper element with said spreading boards having vertically and horizontally tapered grooves to provide varied amounts of space for receiving insects with varied-sized bodies for spreading and drying with lower element of said container with a readily penetrable surface for holding pinned insect specimen which is an integral and continuous part of the entire element.

3. A container having upper and lower elements of molded readily penetrable material for fixing, holding, and storage of dead insect specimens with insect spreading boards and working space incorporated into and serving as a structural part of the upper element with said spreading boards having vertically and horizontally tapered grooves to provide varied amounts of space for receiving insects with varied-sized bodies for spreading and drying with lower element of said container with a readily penetrable surface for holding pinned insect specimen which is an integral and continuous part of the entire element with said lower element of said container with a recessed under surface and the said upper element with a protruding upper surface to facilitate safe and convenient stacking of said containers in storage.

* * * * *